(12) United States Patent
Apps et al.

(10) Patent No.: US 9,830,747 B2
(45) Date of Patent: Nov. 28, 2017

(54) ENGINE HEALTH MONITORING

(75) Inventors: David Apps, Coventry (GB); Timothy M. Smith, Derby (GB)

(73) Assignee: ROLLS-ROYCE plc, London (GB)

( * ) Notice: Subject to any disclaimer, the term of this patent is extended or adjusted under 35 U.S.C. 154(b) by 1589 days.

(21) Appl. No.: 12/451,290

(22) PCT Filed: May 14, 2008

(86) PCT No.: PCT/GB2008/001654
§ 371 (c)(1),
(2), (4) Date: Nov. 5, 2009

(87) PCT Pub. No.: WO2008/152346
PCT Pub. Date: Dec. 18, 2008

(65) Prior Publication Data
US 2010/0138132 A1    Jun. 3, 2010

(30) Foreign Application Priority Data
Jun. 12, 2007    (GB) .................................. 0711256.8

(51) Int. Cl.
G06F 7/00 (2006.01)
G07C 3/08 (2006.01)
F02C 9/28 (2006.01)
B60W 10/06 (2006.01)

(52) U.S. Cl.
CPC .............. *G07C 3/08* (2013.01); *B60W 10/06* (2013.01); *F02C 9/28* (2013.01)

(58) Field of Classification Search
CPC ............. G07C 3/08; B60W 10/06; F02C 9/28
USPC .... 701/99–102, 110, 114; 60/204, 274, 276, 60/285, 602, 773, 796
See application file for complete search history.

(56) References Cited

U.S. PATENT DOCUMENTS

| | | | |
|---|---|---|---|
| 4,137,721 A | 2/1979 | Glennon et al. |
| 4,215,412 A | 7/1980 | Bernier et al. |
| 5,018,069 A | 5/1991 | Pettigrew |
| 5,309,379 A | 5/1994 | Rawlings et al. |

(Continued)

FOREIGN PATENT DOCUMENTS

| | | |
|---|---|---|
| GB | 2 424 490 A | 9/2006 |
| JP | A-2000-099132 | 4/2000 |
| WO | WO 2006/107295 A1 | 10/2006 |

OTHER PUBLICATIONS

David Clifton, Condition Monitoring of Gas-Turbine Engines, Jan. 2006, Department of Engineering Science, University of Oxford.*

(Continued)

*Primary Examiner* — Khoi Tran
*Assistant Examiner* — Majdi Alsomiri
(74) *Attorney, Agent, or Firm* — Oliff PLC

(57) ABSTRACT

A method of monitoring the health of a gas turbine engine of at least a pair of engines of an aircraft for example. The method comprising the steps of: a) obtaining steady state readings from predetermined sensors on the engines; b) calculate a percentage difference of the steady state readings from a unique engine linear synthesis model for each engine; c) compare the difference between the percentage differences for each engine and d) where this difference exceeds a predetermined value issue a warning as to an engine health problem. Maintenance of the engine can therefore be advantageously scheduled.

10 Claims, 2 Drawing Sheets

(56) References Cited

U.S. PATENT DOCUMENTS

| | | | |
|---|---|---|---|
| 5,566,091 A | 10/1996 | Schricker et al. | |
| 5,933,345 A * | 8/1999 | Martin et al. | 700/44 |
| 6,202,400 B1 * | 3/2001 | Utamura et al. | 60/773 |
| 6,278,962 B1 * | 8/2001 | Klimasauskas et al. | 703/13 |
| 6,606,580 B1 * | 8/2003 | Zedda et al. | 702/185 |
| 6,675,639 B1 * | 1/2004 | Schricker et al. | 73/114.79 |
| 6,868,325 B2 * | 3/2005 | Menon et al. | 701/100 |
| 6,904,328 B2 * | 6/2005 | Rietman et al. | 700/97 |
| 2005/0171705 A1 | 8/2005 | Renner | |
| 2009/0271149 A1 * | 10/2009 | Brown | 702/182 |

OTHER PUBLICATIONS

International Search Report and Written Opinion issued in international application No. PCT/GB2008/001654 dated Aug. 5, 2008.
British Search Report issued in British Application No. GB0711256.8 dated Sep. 26, 2007.

\* cited by examiner

ENGINE HEALTH MONITORING

This invention relates to health monitoring of gas turbine engines.

WO2006/107295A1 discloses a method of monitoring turbine engines used in aircraft from sensor signals from an engine for a predetermined set of engine characteristics. The signals are transmitted to a nonlinear engine model that predicts the output values for the given set of engine characteristics. The model generates residuals by calculating the difference between the actual values and the predicted values for each member of the set. The generated residuals are evaluated to estimate bounds of uncertainties as indicative of sensor noise. Incoming residuals from ongoing actual engine values are continuously tested against the bounds. A fault is signalled for each of the set of characteristics when a detected bound is exceeded. A computer is used to calculate the fault residual for each of the set of characteristics and the closest fault residual is selected as a diagnosed fault.

This method is for long term trend monitoring and diagnostics, and it proposes that a deterioration signature be incorporated into a synthesis model by reducing the compressor efficiency of the synthesis model.

The main problem with this prior art method is that it is difficult to model due to operational differences between the actual engine and the assumed operation for the model, and which comprises some degree of guesswork.

The object of the present invention is therefore to provide an indication of unacceptable deterioration or even non-operability of a gas turbine engine prior to that problem actually occurring. A further object of the present invention is to enable fleet management and prioritisation of potential problems and schedule their repair.

According to the invention, there is provided a method of monitoring the health of a gas turbine engine of at least a pair of associated engines, the method comprising the steps of: a) obtaining steady state readings from predetermined sensors on the engines; b) calculate a percentage difference of the steady state readings from a unique engine linear synthesis model for each engine; c) compare the difference between the percentage differences for each engine and d) where this difference exceeds a predetermined value issue a warning as to an engine health problem.

Typically, the predetermined value is less than 0.5% and preferably within between 0.1% and 0.2%.

Preferably, the steady state readings are from any one or more of a turbine gas temperature, a spool speed and compressor efficiency.

Normally, the method comprises the step of calculating the percentage difference of the steady state readings on a moving average basis.

Preferably, the moving average basis is conducted by redatuming each engine's steady state readings.

Usually, the redatuming is carried out between 3 and 6 months prior to engine deterioration.

Advantageously, the unique engine linear synthesis model for each engine is an ideal steady state point for a perfect engine.

Embodiments of the invention will now be described by way of example only, with reference to the accompanying diagrammatic drawings, in which:—

Figure 1:
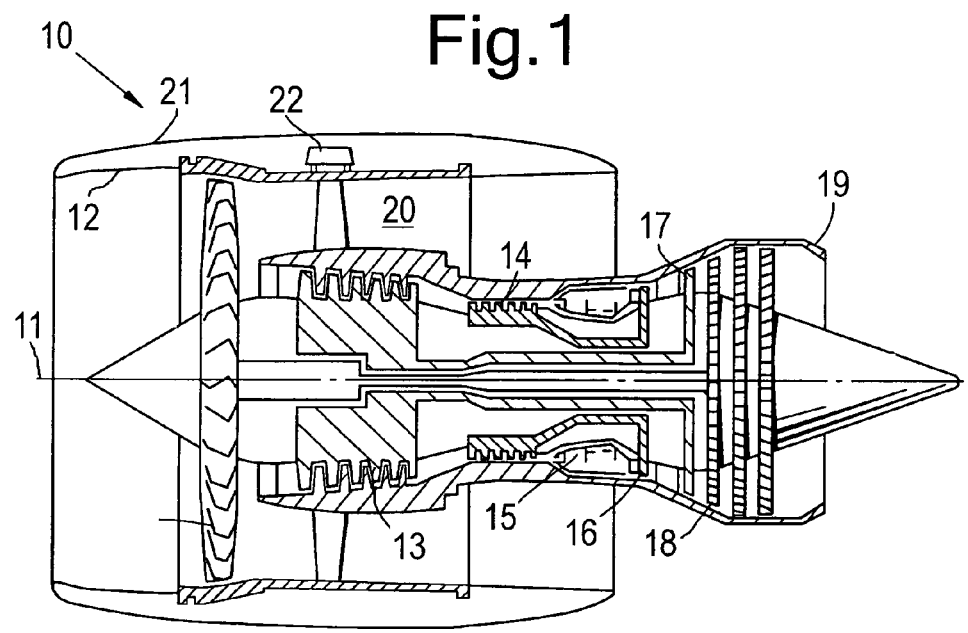
FIG. 1 is a sectional side view of a gas turbine engine.

With reference to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and a core exhaust nozzle 19.

The gas turbine engine 10 works in the conventional manner so that air entering the intake 11 is accelerated by the fan to produce two air flows: a first air flow into the intermediate pressure compressor 13 and a second air flow which passes through a bypass duct 20 defined by a nacelle and provides propulsive thrust. The intermediate pressure compressor 13 compresses the airflow directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive, the high, intermediate and low-pressure turbines 16, 17 and 18 before being exhausted through the nozzle 19 to provide additional propulsive thrust. The high, intermediate and low-pressure turbines 16, 17 and 18 respectively drive the high and intermediate pressure compressors 14 and 13 and the fan 12 by suitable interconnecting shafts.

An Engine Electronic Controller (EEC) 22 monitors and controls the engine's functioning via an array of sensors and instruments located in and around the engine's components.

It is well known that gas turbine engines suffer efficiency deterioration during their service life. Engines occasionally suffer more acute deterioration and it is desirable to be able to identify this more acute deterioration at an early stage so that maintenance may be scheduled thereby minimising disruption for the operator. The present invention, for example, is used as part of an efficiency deterioration analysis of the high-pressure compressor and is an integral part of performance trend monitoring. Trend monitoring is constantly used as a reliable method of analysis in diagnosing an unknown engine-deteriorating trend and is capable of identifying recognized engine or component health problems. The sensitivity of the method of the present invention reveals subtle trend changes enabling early scheduling of maintenance.

The methodology of the present invention is a smoothed Engine-to-Engine comparator analysis tool that has the invaluable capability for identifying critical engine problems and supporting fleet business in unscheduled engine removal. It provides a visual observation on the health of an engine, see FIG. 2.

An aircraft, which in this example has two similar engines 10, undergoes a number of flight phases three of which are take-off, climb and cruise. At each of these flight phases, a steady state point is recorded by every instrument installed on each aircraft engine including ambient conditions, core engine pressures and temperatures, altitude and aircraft speed.

These individual engine steady state speeds, e.g. core engine pressures and temperatures, are subtracted from a unique aircraft linear synthesis model point that has been run to the same aircraft conditions as the corresponding flight phase point. The synthesis model point is the ideal steady state point for a perfect engine. The difference or delta to model (Δ2M) value is divided by the calculated synthesis point to give the percentage change to the synthesis model point. The Δ2M has the affect of smoothing the data by removing the variation due to flight phase, it can be regarded as analogous to Thermodynamic non-dimensional corrections. The equation is:

% Difference≡Δ2M=(Model−Actual)*100/Model.

Each engine on the aircraft has the Δ2M calculated and a 'moving average' of the values are calculated. The moving average varies depending on the total amount of points analysed and the sensitivity of the data. The moving average is defined by the formula $$F_{(t+1)} = \frac{1}{N} \sum_{j=1}^{N} A_{t-j+1}$$

where
  N is the number of prior points to include in the moving average
  $A_j$ is the actual value at point j
  $F_j$ is the forecasted value at point j
The 'moving average' is based on the average value of the variable over a specific and predetermined number of preceding points.

Each engine's first n points (typically n equals ten points) are averaged and calculated to zero, this is commonly referred to as "normalised" to the zero datum. All data points are then re-evaluated to the normalised value. The datum is typically three to six months prior to the engine deterioration noticed and it is accepted that all aircraft engines at this date were not indicating any trend deterioration. Generally three to six months of data prior to a trend shift provides adequate stabilisation of the data and the possibility of any early indication of the potential problem. The theory of this method is that all engines will deteriorate similarly over a short period of three to six months unless one engine has suffered an event that has accelerated its deterioration.

As already mentioned, an early indicator of say a compressor problem is a deterioration of the compressor's efficiency. By calculating the compressor efficiency and comparing each aircraft engine it can provide an extremely useful early warning to fleet management to minimise disruption to the operator if an engine removal or overhaul is imminent.

Typically, this analysis will involve reviewing turbine gas temperature (TGT) and high-pressure spool speed (N3) as the prime components to identifying engine performance deterioration. However, with compressor (usually the HPC) efficiency also being monitored problems other than HPC efficiency can also be diagnosed particularly with the HP turbine and compressor bleeds. If the TGT has significantly increased and the N3 and HPC efficiency shifts are coincidental with the TGT increase, the engine problem can be considered as potentially valid.

Depending on the accuracy of the data, the sensitivity of this engine-to-engine method can be as low as a difference of 0.1% but typically, most parameter trend shifts are considered valid at 0.2% absolute difference to the sister or comparator engine.

Figure 2:
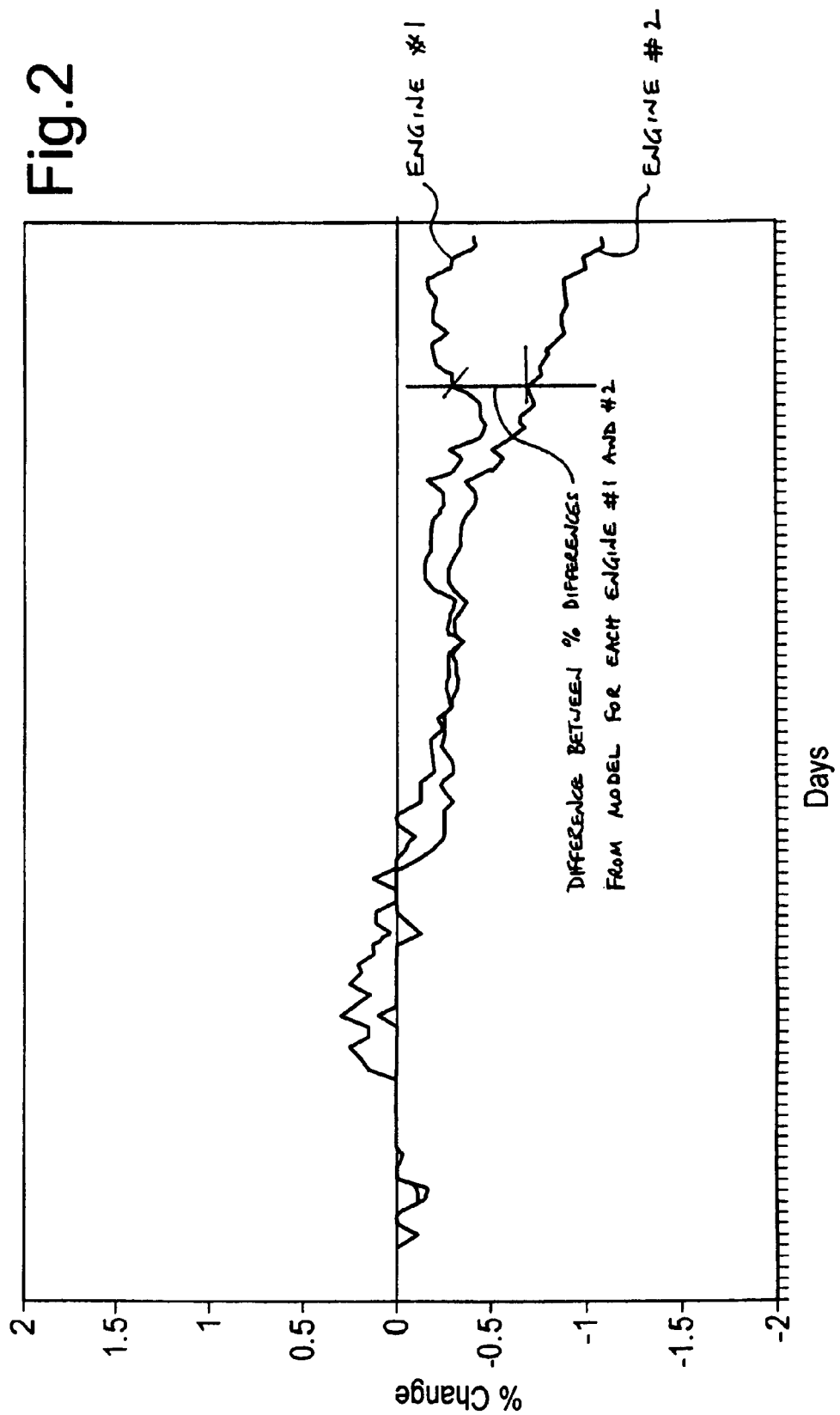
FIG. 2 is a graph showing typical high-pressure compressor deterioration as a percentage versus time of two engines and in accordance with the present invention.

In a preferred embodiment of the present invention as shown in FIG. 2, a difference between the aircraft's two engine in HPC efficiency deterioration of −0.5% and a TGT increase of 0.5% will activate the investigation process.

An advantage of the health monitoring method of the present invention is the high pressure compressor efficiency of a three-spool engine is analysed for short-term degradation due to HPC damage or a component wear that has affected the HPC efficiency deterioration. Analysing other Δ2M parameters and correlating to a known signature database quickly yields a solution. Each engine problem has a unique signature where the engine speeds, pressures and temperatures will increase or decrease at different magnitudes according to the problem. These directions of changes are compared to a database of known engine problems or a matrix of component changes that provide a solution to the problem. Correlating actual data changes to known or theoretical values can offer greatly improved accuracy in diagnosis.

Another advantage of the health monitoring method of the present invention is that it analyses over a short-term period as stated earlier typically three to six months where it is considered no significant operational deterioration has occurred and the Delta to model (Δ2M) parameter is datumed to zero (i.e. normalised) and compared to the aircraft sister engine or engines. HPC efficiency deterioration is a now considered as a prime deterioration indicator comparable with TGT and N3 related analysis methods. It does not require deterioration factors built in to the model, which at best requires some degree of guesswork.

Figure 3:
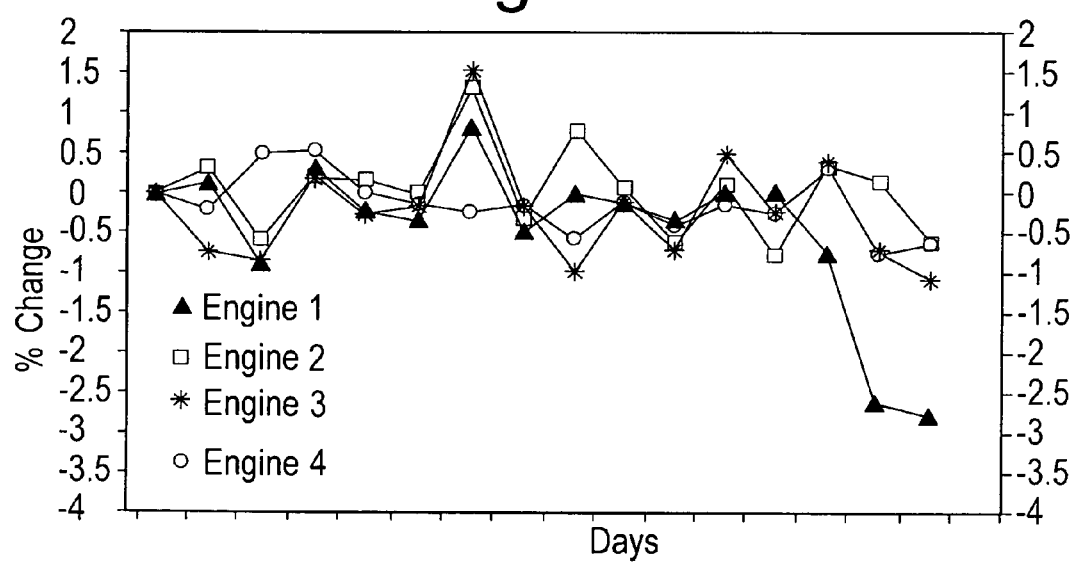
FIG. 3 is a graph showing typical high-pressure compressor deterioration as a rate of change versus time of four engines and in accordance with the present invention.

FIG. 3 shows typical HPC efficiency deterioration for each of four engines of an aircraft and uses a rate of change analysis. The HPC efficiency does not require a linear model and engine-to-engine analysis can be carried out on this alone.

The equation for the High Pressure Compressor efficiency ($\eta_{HPC}$) calculation removes the requirement of the linear model values because of the equation ratio and root effect smoothing the variations due to flight phase.

$$\eta_{HPC} = \frac{Tin\left[\left(\frac{Pout}{Pin}\right)^{\frac{\gamma-1}{\gamma}} - 1\right]}{Tout - Tin}$$

Where
Tin=High Pressure Compressor Entry Temperature.
Tout=High Pressure Compressor Exit Temperature.
Pin=High Pressure Compressor Entry Pressure.
Pout=High Pressure Compressor Exit Pressure.
γ=Ratio of specific Heat (Cp/Cv); typically this is 1.4 for air.

The excellent sensitivity of the method allows the data to be analysed using 'ramp' and/or 'step' methods. A ramp method is used for gradual deterioration trends over a time period of say three to six months and generally uses moving average; FIG. 2 shows a typical ramp trend method for a two engine aircraft. Wherein R=(Σω)/n where ω=Δ2M and R=moving average for n points.

The step method is to detect a sudden trend change such as blade loss or a bleed failure and typically uses rate of change or differentiation (D') of the data points. With the quality of data improved, the method can be adapted to compare the most recent data point received to the last data point or to some previous data point to test for a significant change. If the rate of change has exceeded prerequisite criteria, this could be flagged for investigation. FIG. 3 shows a typical a step method for four engine aircraft. Wherein $$D'=(\omega i+n-\omega i)/n$$

The methodology of the present invention allows use on any gas turbine engine be it a marine or industrial one.

The invention claimed is:

1. A method of monitoring the health of a gas turbine engine of at least a pair of associated engines, the method comprising the steps of
   obtaining in-flight steady state readings from predetermined sensors on the engines, comprising any one or more of a temperature, a pressure, and a spool speed,
   calculating a percentage difference of the steady state readings from a unique engine linear synthesis model for each engine,
   comparing the difference between the percentage differences for each engine and
   where this difference exceeds a predetermined value issuing a warning as to an engine health problem, and
   where the percentage differences of the steady state readings are calculated on a moving average basis normalized to zero.

2. A method as claimed in claim 1 wherein the predetermined value is +/−0.5 or less than 0.5%.

3. A method as claimed in claim 2 wherein the predetermined value is between and includes 0.1% and 0.2%.

4. A method as claimed in claim 1 wherein the efficiency of a compressor $$\text{efficiency of a compressor} = \frac{T_{in}\left[\left[\frac{P_{out}}{P_{in}}\right]^{\frac{\gamma-1}{\gamma}}-1\right]}{T_{out}-T_{in}}.$$

5. A method as claimed in claim 4 where $T_{in}$=Compressor Entry Temperature, $T_{out}$=Compressor Exit Temperature, $P_{in}$=Compressor Entry Pressure, $P_{out}$=Compressor Exit Pressure, and $\gamma$=Ratio of Specific Heat ($C_P/C_v$).

6. A method as claimed in claim 1, wherein the moving average basis is conducted by redatuming each engine's steady state readings.

7. A method as claimed in claim 6 wherein the redatuming is carried out between 3 and 6 months prior to engine deterioration.

8. A method as claimed in claim 1 wherein the unique engine linear synthesis model for each engine is an ideal steady state point for a perfect engine.

9. A method as claimed in claim 1 wherein the method comprises the step of analyzing other percentage differences and correlating to a known signature database.

10. A method as claimed in claim 1 wherein the method comprises the step of comparing the directions of change, increase or decrease, to a database of known engine problems or a matrix of component changes to provide a solution to the engine health problem.

* * * * *